(12) United States Patent
Ionov (10) Patent No.: US 6,441,947 B1
(45) Date of Patent: Aug. 27, 2002

(54) METHOD AND APPARATUS FOR OPTICAL BEAM STEERING BASED ON A CHIRPED DISTRIBUTED BRAGG REFLECTOR

(75) Inventor: Stanislav I. Ionov, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 09/545,633

(22) Filed: Apr. 7, 2000

(51) Int. Cl.[7] ............................................. G02B 26/08
(52) U.S. Cl. ..................... 359/298; 359/263; 359/245; 359/318; 359/322; 359/584; 359/572; 359/385; 359/10
(58) Field of Search ................................. 359/584–589, 359/572, 573, 575, 576, 245, 263, 298, 318, 322; 385/10

(56) References Cited

U.S. PATENT DOCUMENTS

| | | | |
|---|---|---|---|
| 3,894,792 A | 7/1975 | Komatsubara et al. ...... | 359/315 |
| 4,240,696 A | * 12/1980 | Tracy et al. ................ | 359/578 |
| 4,639,091 A | 1/1987 | Huignard et al. .......... | 349/202 |
| 4,953,939 A | 9/1990 | Epworth ..................... | 359/173 |
| 5,018,835 A | 5/1991 | Dorschner .................. | 349/140 |
| 5,082,342 A | 1/1992 | Wight et al. ................ | 385/8 |
| 5,093,747 A | 3/1992 | Dorschner .................. | 359/316 |
| 5,351,127 A | 9/1994 | King et al. ................. | 356/445 |
| 5,943,159 A | 8/1999 | Zhu ............................ | 359/316 |

FOREIGN PATENT DOCUMENTS

| | | |
|---|---|---|
| EP | 0 051 394 A1 | 5/1982 |
| EP | 0 514 857 A2 | 11/1992 |
| EP | 0 664 474 A1 | 7/1995 |
| JP | 59069732 | 4/1984 |

OTHER PUBLICATIONS

Trezza, J.A. , et al., *Large Format Smart Pixel Arrays and Their Applications*. Sanders, A Lockheed Martin Company; IEEE 1998 Aerospace Conference; Mar. 21–28, 1998; Aspen, CO.; p. 299.

* cited by examiner

*Primary Examiner*—Evelyn A Lester
(74) *Attorney, Agent, or Firm*—Ladas & Parry

(57) ABSTRACT

An optical beam steerer includes one or more layers of electro-optically active material in which is formed a chirped distributed Bragg reflector. An electric field generated across the electro-optically active material in the direction of propagation of the chirped distributed Bragg reflector causes the index of refraction within the material to change. The electric field varies in a direction normal to the direction of propagation of the chirped distributed Bragg reflector which causes a variation in the local index of refraction proportional to the strength of the electric field. Changes in the index of refraction cause the wavefront of the incident optical beam to experience different delays such that the incident optical beam is reflected out of the beam steerer at an angle that is tangential to the direction of variation of the applied electric field. Two dimensional beam steering is provided by the creation of two electric fields that are orthogonal to each other. Optical beam correction is provided by a matrix of individually addressable pixels that provide for individually controllable variations in the local index of refraction in the electro-optically active material.

31 Claims, 5 Drawing Sheets

METHOD AND APPARATUS FOR OPTICAL BEAM STEERING BASED ON A CHIRPED DISTRIBUTED BRAGG REFLECTOR

FIELD OF THE INVENTION

The present invention relates to an electro-optic device of the kind appropriate for optical beam steering applications.

BACKGROUND OF THE INVENTION

Agile optical beam steering is often required in applications ranging from laser radar ranging to free-space optical communications. In a free-space optical communication system, beam steering is required to maintain the lock between the transmitter and receiver when either or both may be moving or may be affected by vibrations. In laser radar ranging, beam steering provides the ability to track moving or maneuvering targets. These applications require the ability to quickly steer an optical beam to a new direction, that is, they require agile optical beam steering.

One way in which to achieve beam steering is to transmit an optical beam onto a device that will reflect the beam in a different, but controllable direction. The beam steerer provides control over the angle between the optical beam incident on the beam steerer and the optical beam reflected by the device. A high performance beam steering system should provide a minimum of loss between the incident beam and the reflected beam.

Optical beam steering can be implemented with electro-mechanical systems. Such systems generally consist of a mirror mounted on an electrical actuator. These systems provide relatively low losses for the strength of the reflected beam. However, such electro-mechanical systems are limited to low response frequencies up to the order of 1 KHz. The moving parts of an electro-mechanical system along with size and weight factors are considered to be major limitations of such a system.

Electro-optical devices for optical beam steering are also known. One such device is disclosed in U.S. Pat. No. 4,639,091, issued Jan. 27, 1987 to J.-P. Huignard et al. Huignard discloses an optical beam steerer comprising an electro-optical liquid crystal having an upper side upon which strip electrodes are disposed and a lower side upon which a common electrode, reflective at the optical beam wavelength, is disposed. A step voltage waveform is applied to the electrodes, which causes local variations in the index of refraction within the liquid crystal. These variations create a diffraction grating, which is used to provide steering of a beam incident on the device. One of the shortcomings of the invention disclosed by Huignard et al. is the poor response time of the liquid crystal molecules to the variation in voltage. Hence, the steering angle cannot be quickly changed.

Another optical beam shifter using a liquid crystal is disclosed in U.S. Pat. No. 5,018,835, issued May 28, 1991 to T. A. Dorschner. Dorschner also discloses a liquid crystal with electrodes on its upper side and lower side. Additional refractive means are interposed between the incident optical beam and the liquid crystal, which allows a thinner liquid crystal to be used. A thinner liquid crystal provides faster response time to voltage variations, and thus, faster beam steering. The invention disclosed by Dorschner is still limited by the response time of the liquid crystal material, which will only allow beam steering rates on the order of 1 to 10 KHz. An additional shortcoming is that the beam angle is only steered in one dimension, the dimension defined by the plane that is perpendicular to the orientation of the surface of the liquid crystal.

A faster electro-optical beam steering device is described by J. A. Trezza, et al. in "Large Format Smart Pixel Arrays and Their Applications," IEIEE 19th Aerospace Conference, Aspen, Colo., p. 299. It comprises modulator-emitter-detector (MED) GaAs based devices grouped together and connected in parallel to custom SRAM CMOS driver chips. Each device comprises a pixel in the array, and current technology allows the pixels to be closely spaced. Each pixel consists of quantum wells, and the refractive index of each pixel can be varied by changing an electric field applied across the pixel. Phase modulating the pixels within the array provides the capability of steering an optical beam incident on the array. Current technology provides the beam steering rates in two dimensions on the order of 20 MHz. However, the transmit efficiency of the device is quite low, where the intensity of reflected light is less than 10% of the intensity of the incident light.

Optical beam steering may also be provided by directing light through a device in which the angle of the light is changed. One such device is disclosed in U.S. Pat. No. 5,082,342, issued Jan. 21, 1992 to D. R. Wight, et al. Wight discloses an electro-optic waveguide device containing an array of electrically biasable waveguides of electro-optically active material. The array of waveguides creates a farfield diffraction grating. An electric field applied to the waveguides alters the refractive index within the waveguides. Changes in the refractive index change the diffraction angle resulting in shifts in the main lobe of the diffraction pattern generated by light sent through the device. Shifting the main lobe essentially results in steering the angle of an optical beam transmitted into the device. Wight also discloses an arrangement of the waveguides that allows for beam steering in two dimensions.

The invention disclosed by Wight provides substantially faster beam steering rates than the inventions earlier described. Choice of the appropriate electro-optically active material could provide steering rates in excess of 1 GHz. However, the device still has some limitations. Transmission of light through the device and the creation of a diffraction pattern may result in significant losses to light intensity and thus limit the utility of the device. In addition, manufacture of the device described by Wight is complicated. Creation of the two-dimensional beam steering device would require a micro-manipulation apparatus. Finally, the device provides no mechanism for compensating for beam dispersion for the optical beam incident on the device.

There exists a need in the art for an optical beam steering device that can provide high rate beam steering without significant loss of intensity to the steered optical beam. The need also exists for a device that can provide those capabilities and steer an optical beam in two dimensions. The need also exists for an optical beam steerer that can provide some measure of optical wavefront correction.

SUMMARY OF THE INVENTION

Accordingly, it is an object of the present invention to provide a method and apparatus for optical beam steering that can provide low loss, high rate beam steering. It is another object of the present invention to provide such beam steering in one and two dimensions. It is a further object of the present invention to provide for optical wavefront correction.

These and other objects of the present invention are accomplished by providing at least one layer of electro-optically active material within which is formed a chirped distributed Bragg reflector. The chirped distributed Bragg reflector is oriented in the electro-optically active material so that the direction of propagation of the chirped distributed Bragg reflector is parallel with light incident on the electro-optically active material. The chirped distributed Bragg reflector reflects optical beams at different wavelengths from the electro-optically active material after those beams have traveled different distances within the electro-optically active material. An electric field is applied across the electro-optically active material in a direction parallel to the direction of propagation of the chirped distributed Bragg reflector. The applied electric field causes changes in the local index of refraction within the electro-optically active material, where the local index of refraction will vary with the intensity of the electric field. Changes in the local index of refraction will vary the distance at which an optical beam at a specific wavelength will travel within the electro-optically active material. The varying distance will cause the wavefront of the incident optical beam to experience different delays such that the incident optical beam is reflected out of the electro-optically active material at a different angle than which it entered the device.

One embodiment of an optical beam steerer in accordance with the present invention uses a linearly varying electric field to provide beam steering. A voltage source connected to one end of a resistive layer located beneath at least one layer of electro-optically active material will cause an electric field to be present between that resistive layer and a conductive layer located on top of the electro-optically active material. The conductive layer is transparent to the incident light beam, so the light beam can travel into the electro-optically active material and is reflected by the chirped distributed Bragg reflector within the material. In this embodiment, the maximum angle of beam steering is dependant on the thickness of the electro-optically active material. Two dimensional steering is achieved by an electric field generated from a resistive layer on top of the electro-optically active material and a second electric field generated orthogonally to the first field by a resistive layer on the bottom of the electro-optically active material.

If the electro-optically active material layer or layers are constructed from a near resonant semiconductor structure, the magnitude of the maximum optical beam steering angle and the speed at which a beam can be steered is dependent upon the direction of the electric field. If the electric field is applied in the direction of the semiconductor junction, a greater maximum steering angle will be achieved, but at a slower rate. If the electric field is applied inversely to the direction of the semiconductor junction, a smaller maximum steering angle is obtained, but the steering angle rate is larger.

An alternative embodiment of the present invention uses a periodic step-wise varying electric field provided by multiple electrodes to provide beam steering. The step-wise variation in electric field causes a step-wise variation of the local index of refraction within the electro-optically active material that creates a staircase diffraction grating for light transmitted into the device. The periodic electric field is generated so that the periodic variation in the index of refraction results in a delay that causes a phase shift in portions of the incident light beam of up to $2\pi$. The efficiency of the device is related to the number of steps in the electric field. Two dimensional beam steering is provided by generating a periodic step-wise varying electric field across the electro-optically active material in two orthogonal directions.

DETAILED DESCRIPTION

Figure 1:
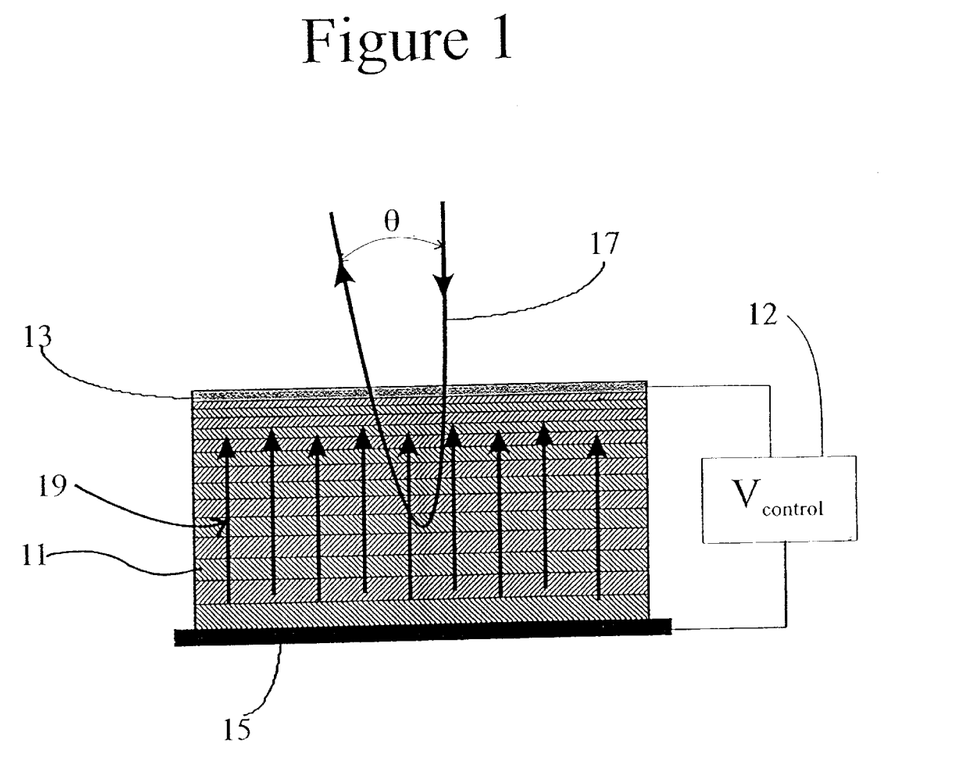
FIG. 1 shows a general representation of an optical beam steerer in accordance with the present invention comprising electro-optically active material having a chirped distributed Bragg reflector formed within it and sandwiched between a top conductor and a bottom conductor providing an electric field across the electro-optically active material.

Referring to FIG. 1, there is shown a simplified and dimensionally exaggerated view of an optical beam steerer according to the principles of the present invention. The steerer comprises at least one layer of electro-optically active material 11 sandwiched between an upper conductor 13 and a lower conductor 15. The electro-optically active material 11 has a chirped distributed Bragg reflector, the characteristics of which will be described below, formed within it. An electric field 19 is applied across the electro-optically active material 11 by the bottom conductor 15 and the top conductor 13 connected to a voltage source 12. A light beam 17 transmitted into the device travels through the top conductor 13, which is transparent to the light beam, and is reflected back out of the beam steerer at an angle θ to the incident light beam.

Electro-optically active materials are well known in the art. However, for use in the present invention, the electro-optically active material must be capable of having a chirped distributed Bragg reflector formed within it. Materials that provide such a capability, for example, include lithium niobate ($LiNbO_3$), lithium tantalate ($LiTaO_3$), and lithium niobate doped with titanium. The present invention uses one or several layers of such materials. The electro-optically active material may also comprise an electro-refractive semiconductor chirped distributed Bragg reflector structure. A semiconductor chirped distributed Bragg reflector structure comprises several very thin layers of materials having different refractive indices. Each layer comprises semiconductor material known to exhibit an excitonic band just above the photon energy.

The present invention requires that an electric field be applied across the electro-optically active material in a direction generally parallel to a direction of propagation of the chirped distributed Bragg reflector formed within the electro-optically active material. The direction of propagation of the chirped distributed Bragg reflector must also be generally parallel to light incident on the electro-optically active material. The intensity of the electric field will be varied in a direction normal to an incident light beam, to provide steering of the incident light reflected by the chirped distributed Bragg reflector. Therefore, an electric field generating means is used to controllably steer the incident light. Generation and control of the electric field are accomplished by means well known in the art. One such means is illustrated in FIG. 1, where a voltage source 12 connected to an upper conductor 13 and a lower conductor 15 provides the means for generating and controlling the electric field 19 generated across the electro-optically active material 11.

If the electro-optically active material comprises a semiconductor chirped distributed Bragg reflector structure, the electric field may be applied either in direct or inverse direction of the semiconductor junction. In the direct case, current will flow across the semiconductor material sandwiched between the conductors. In this case, carriers are injected which change the semiconductor refractive index. The change in refractive index increases with the current flow, but the speed of the change in the refractive index will be limited by the carrier relaxation time, thus limiting changes in the refractive index to the order of 1 ns. The current flow, and thus the amount of refractive index change, is limited by the current density that can be handled by the semiconductor material. In the inverse case, the semiconductor material is reverse-biased so the index of refraction is changed as a result of the Frank-Keldysh effect (Stark shift of the exciton band). Thus, the change in the refractive index is directly proportional to the voltage potential across the semiconductor material. The inverse case provides for changes in the refractive index at the sub-nanosecond level. However, the voltage potential across the semiconductor material is limited by the electrical breakdown characteristics of the material. Hence, an electric field applied in the direct direction of the semiconductor junction will provide greater refractive index changes, but slower response, while an electric field in the inverse direction will provide smaller refractive index changes, but faster response.

If the electro-optically active material does not comprise a semiconductor structure, the change in the index of refraction is independent of the direction of the electric field. The change of the index of refraction varies only with changes in the magnitude of the applied electric field. The magnitude of the change in index of refraction will be similar to that seen with the reverse-biased semiconductor material discussed above.

A periodic fluctuation in the core refractive index of optical media results in a "Bragg grating" or a "distributed Bragg reflector." The pattern of fluctuations can behave as a spectrally selective reflector for electromagnetic radiation. The reflection of a distributed Bragg reflector reaches its maximum at the wavelength λ satisfying the Bragg condition:

$$\beta(\lambda)=\pi/\Lambda \tag{1}$$

where $\beta(\lambda)$ and $\Lambda$ are the wave number at the given wavelength and the period of modulation, respectively.

The present invention requires that the distributed Bragg reflector be chirped instead of uniformly periodic. That is, the period of the refractive index variation (i.e., the linear distance between successive peaks and valleys of the refractive index profile) is not a constant, but instead changes in a predetermined fashion along the propagation axis of the distributed Bragg reflector. Such a Bragg reflector is referred to as a "chirped" distributed Bragg reflector (C-DBR). The propagation axis for a distributed Bragg reflector is the direction in which the incident light travels before being reflected by the reflector. The most common chirped variation is one in which the period increases or decreases as a function, typically an approximately linear function, of position along the distributed Bragg reflector propagation axis.

As indicated above, a chirped distributed Bragg reflector is formed within electro-optically active material by modulating the refractive index within the material. Creation of chirped distributed Bragg reflectors is well known in the art. U.S. Pat. No. 4,953,939, issued Sep. 4, 1990 to R. Epworth, discloses one method for the creation of a chirped distributed Bragg reflector within an optical fiber by using quasi-periodic corrugations with the walls of the fiber to create the required variation in the refractive index. Another method for creating a chirped distributed Bragg reflector within electro-optically active material is by doping multiple layers of lithium niobate with varying levels of titanium.

If a semiconductor C-DBR structure is used as the electro-optically active material of the present invention, the chirped distributed Bragg reflector is formed by controlling the refractive index within the individual layers of the semiconductor structure. One such semiconductor structure can be formed by using epithaxial techniques to create alternating layers of low refractive index aluminum arsenide and high refractive index aluminum gallium arsenide. Each alternation between a low index layer and high index layer is a single refractive index period. The thickness of the alternating layers is increased in a linear fashion so as to provide a linearly increasing change in each refractive index period.

The Bragg condition is satisfied when $$2\Lambda=\lambda n \tag{2}$$

where λ is the resonant wavelength (the wavelength at which light is reflected), n is the refractive index of the distributed Bragg reflector, and Λ is the period of the distributed Bragg reflector. In a linearly chirped distributed Bragg reflector, $$\Lambda(z)=\Lambda_0+\Lambda'z \tag{3}$$

where $\Lambda'$ is the chirp parameter, and z is the classical turning point for a given wavelength. The chirp parameter $\Lambda'=\Delta\Lambda/L$ where $\Delta\Lambda$ is the change in the distributed Bragg reflector period across a DBR structure of depth L. The classical turning point z is the distance within the waveguide at which light at a given wavelength is reflected by the distributed Bragg reflector structure. The turning point z is found from the Bragg condition equation:

$$n\lambda=2(\Lambda_0+\Lambda'z) \tag{4}$$

$$z=(n\lambda/2-\Lambda_0)/\Lambda' \tag{5}$$

Thus, a small change in the refractive index n is sufficient for achieving a large shift of the classical turning point, if the chirp $\Lambda'$ is sufficiently small. The design wavelength of the optical beam steerer can be kept far from the absorption band of the electro-optically active material, which minimizes absorption losses and improves power handling capabilities.

Figure 2:
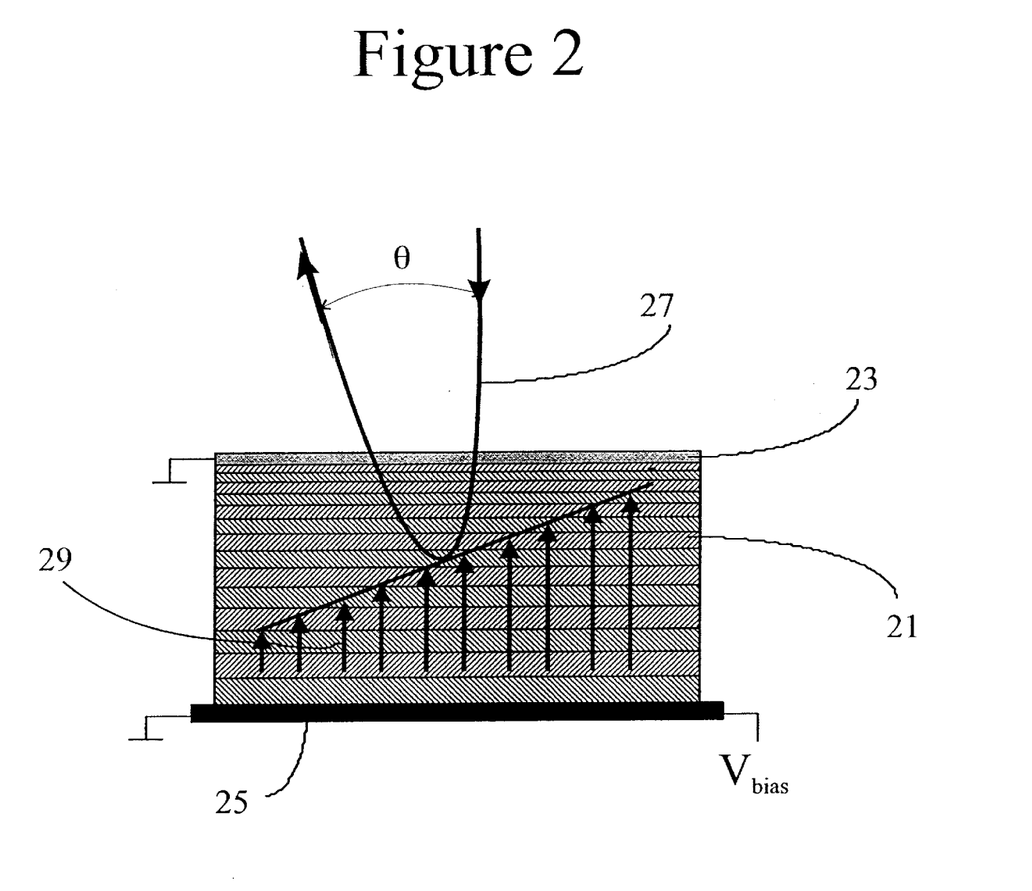
FIG. 2 shows a schematic representation of one embodiment of the present invention for one-dimensional beam steering using a uniform electric field.

FIG. 2 illustrates an embodiment of the present invention that can steer an optical beam in one dimension. The embodiment shown in FIG. 2 uses a continuous electric field to control the turning point within the electro-optically active material, and thus control the angle of the reflected beam. In FIG. 2, the bottom conductive layer is a resistive layer 25 deposited on the bottom of the electro-optically active material 21. A voltage is applied to one end of the resistive layer 25. The top conductive layer 23 is grounded. This layer is also transparent to the light beam transmitted into the device. Semiconductor materials with a proper bandgap and doping provide both substantial transparency to certain wavelengths of light and electrical conductivity. Since the top layer is grounded, a transverse electric field 29 is created across the electro-optically active material 21, where the strength of the field decreases linearly. The index of refraction will change with the strength of the electric field across the device. As a result, the classical reflection point for the incident light beam 27 changes across the device, which provides one-dimensional steering for the incident light.

The steering angle θ according to the present invention is dependent upon the change in the classical turning point:

$$\theta = 2n\Delta z/L \quad (6)$$

where Δz is the shift of the classical reflection point due to changes in the refractive index and L is the total depth of the layer or layers of electro-optically active material oriented normal to the incident light beam. The relationship between the change in the turning point and the change in the refractive index is shown by:

$$\Delta z = \frac{\lambda dn}{2\Lambda'} \quad (7)$$

Here, dn is the change in the refractive index due to the application of the electric field.

Note that the steering angle alone does not represent an important characteristic of the optical beam steerer since it can easily be increased or decreased by a telescope. Rather, the ratio of the steering angle to the diffraction divergence is important, since it is preserved throughout telescope magnification/demagnification. This ratio is given by $$\frac{\theta}{\theta_d} = \frac{\lambda n}{\Lambda' L} \frac{L}{\lambda} dn = \frac{n}{\Lambda'} dn \quad (8)$$

The change in the refractive index, which causes beam steering, also affects the reflectivity spectrum of the chirped distributed Bragg reflector. To avoid modulating the intensity of the steered optical beam, the chirped distributed Bragg reflector should have a "top-hat" spectrum. This is achieved when the total chirp of the distributed Bragg reflector, equal to Λ'L, exceeds the bandwidth that results from the number of distributed Bragg reflector layers or periods N, shown by:

$$\frac{\lambda}{N} = \frac{2\Lambda}{nN} \quad (9)$$

Therefore, the minimum value of the chirp of the distributed Bragg reflector is obtained from $$\Lambda' > \frac{2}{nN^2} \quad (10)$$

This condition limits the maximum steering angle $$\frac{\theta_{max}}{\theta_d} < \frac{n^2 N^2}{2} dn \quad (11)$$

Note that the normalized steering angle is independent of the width of the device containing the chirped distributed Bragg reflector. As a result, the steering device may be very small, e.g. one millimeter diameter or even less, without sacrificing performance characteristics.

The performance of beam steerer using a linear electric field improves with the number of reflecting layers and maximum achievable refraction index change. For example, the maximum refraction index change achieved via the electro-optic effect in electro-optically active materials is dn~3×10$^{-3}$, which requires an electric field E~10 V/μm. The maximum number of layers N is derived from the chirped distributed Bragg reflector period and the maximum practical thickness of the device. The period of a chirped distributed Bragg reflector structure where the average refractive index n is 3 and is designed to operate in the vicinity of 1.55 μm is $\Lambda_0=\lambda.n/2$~2.3 μm. Therefore, a thickness of 23 μm is required for a layer count of N~10, and a thickness of 230 μm is required for a layer count of N~100. Under these conditions, the maximum steering angle is $\theta_{max}/\theta_d$~2 and 200 respectively. These maximum angles require reverse bias voltages of 230V and 2.3 kV, respectively. Hence, a uniformly controlled optical beam steering device uses a technology that supports growing a thick, approximately 100–300 μm, chirped distributed Bragg reflector structure which can withstand substantial reverse bias of E~10 V/μm without electrical breakdown. A semiconductor material such as InGaAsP is capable of withstanding such voltages.

As previously indicated, the refractive index within electro-optically active material such as lithium niobate changes nearly instantaneously with the change in the electric field. The refractive index in reverse-biased semiconductor material also changes nearly instantaneously with changes in the electric field. Hence, a beam steerer embodied by the present invention can achieve high steering rates, if the electronics controlling the electric field across the material can quickly change that electric field. In the extreme example above, steering the optical beam to its maximum angle within one nanosecond would require the control electronics to change the applied voltage by 2.3 kV within one nanosecond. However, smaller steering angles can be achieved with proportionally smaller changes in applied voltage.

Figure 3:
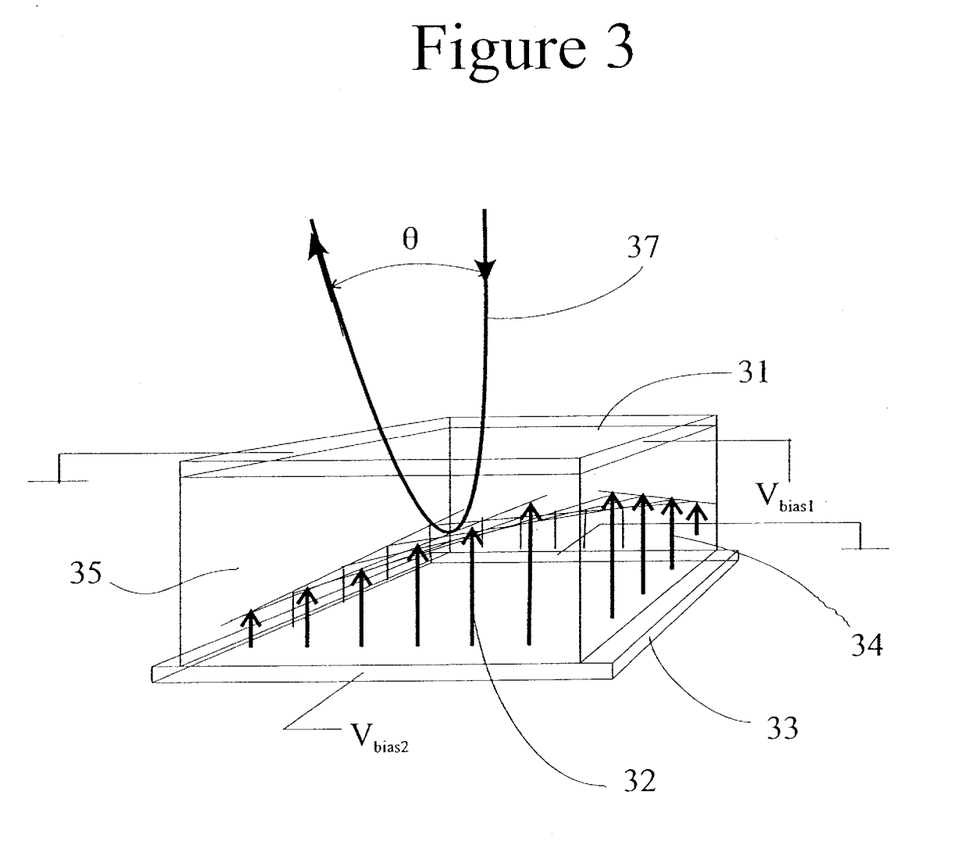
FIG. 3 shows a schematic representation of an embodiment of the present invention for two-dimensional beam steering using two orthogonal uniform electric fields.

FIG. 2 illustrates the steering of an optical beam in a single plane or dimension, the plane parallel to the direction of the variation in the electric field. However, the present invention is not limited to optical beam steering in a single dimension. FIG. 3 illustrates an embodiment of the present invention that provides for two dimensional beam steering. In FIG. 3, one or more layers of electro-optically active material 35 is sandwiched between a top resistive layer 31 and a bottom resistive layer 33. An incident optical beam 37 shines through the top resistive layer 31. Semiconductor materials with a proper bandgap and doping provide a top resistive layer that is substantial transparent to the wavelengths of light of interest and is also electrically conductive. A bias voltage $V_{bias1}$ is applied to the first layer 31 to induce a first transverse electric field 32 across the electro-optically active material layer 35, such that the intensity of the field varies linearly from the right side to the left side of the layer of electro-optically active material 35. Another bias voltage $V_{bias2}$ is applied to the second resistive layer 33 to induce a transverse electric field 34 across the electro-optically active material layer 35, such that the intensity of the field varies across from the front side to the back side of the layer. The variation of intensity of the second field 34 is perpendicular to the direction of variation of the first electric field 32. The combination of the two electric fields creates a single electric field whose variation of intensity is defined by an inclined plane. The optical beam 37 then reflects in a direction that is tangential to that inclined plane so that the beam is steered in a direction that is at an angle θ to the incident optical beam. Hence, this embodiment of the present invention provides two-dimensional beam steering.

Another embodiment of the present invention uses an array of conductors to apply an electrical field across the electro-optically active material. The applied electrical field changes the local index of refraction in a ramped periodic fashion such that a phase delay of up to $2\pi$ is induced in the reflected optical beam. Alternative embodiments have an applied electric field that provides a single ramp across the optical beam steerer, or provides a number of ramps across the device.

Figure 4:
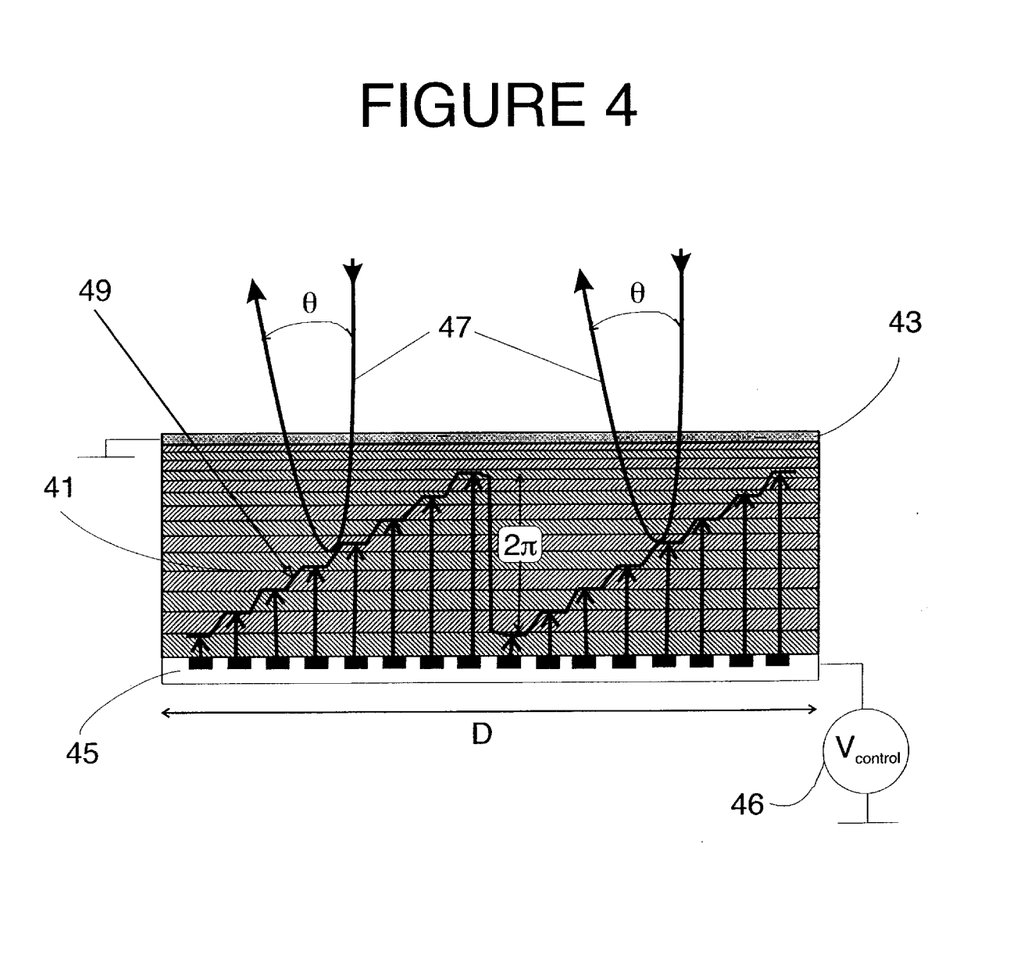
FIG. 4 shows a schematic representation of an embodiment of the present invention for one-dimensional beam steering using an electric field that varies in a stair-step fashion.

FIG. 4 shows an embodiment of the present invention that uses an array of conductors to apply a staircase electric field to provide beam steering. The steerer comprises one or more layers of electro-optically active material 41 interposed between a top conductor 43 and an N plurality of electrodes 45 located on the bottom of the electro-optically active material. The top conductor is transparent to an incident optical beam. Each of the N electrodes 45 is separately controlled by a voltage control means 46 so as to generate an electric field 49 that varies in intensity in a stair-step fashion. The electro-optically active material 41 has a chirped distributed Bragg reflector formed within it. A light beam 47 transmitted into the device will be reflected out of the beam steerer at an angle $\theta$ to the incident light beam.

Generation of a staircase electric field within the electro-optically active material will cause a step-wise variation in the index of refraction and a step-wise variation in the classical turning point. The step-wise variation in turning point will impart a step-wise variation of phase shifts on the incident optical beam 47, resulting in a staircase diffraction grating. The maximum reflection angle $\theta$ is given by $\theta \approx \lambda/\Phi$ where $\lambda$=incident wavelength and $\Phi$ is the staircase cycle length. Optimum diffraction efficiency is obtained if the amplitude of the phase shift at the top of the staircase is equal to $2\pi$.

In such a grating of spacing $\Phi$ which is sampled in K discrete steps (where K is an integer), the diffraction efficiency is given by the relationship:

$$\eta = \left[\frac{\sin(\pi/K)}{\pi/K}\right]^2 \quad (12)$$

In a grating for which K=4, a four step staircase waveform, is used, the diffraction efficiency $\eta \approx 80\%$. In a grating for which K=8, an eight step staircase waveform as shown in FIG. 4, is used, the diffraction efficiency $\eta \approx 95\%$. Hence, more steps in the electric field variation provides greater diffraction efficiency and less loss induced by the beam steerer. The number of controllable electrodes will control the number of steps in the electric field.

For example, if only a single ramp is to be applied across the optical beam steerer, $N_{electrodes}$=K, that is, the number of electrodes will be equal to the number of steps in the ramp. In this case, the maximum beam steering angle is obtained from the same equation (equation 11) used for the linear electric field embodiment of the present invention. An embodiment of the present invention uses a staircase electric field created by direct biasing a structure of semiconductor material such as InGaAsP. In this case, the refractive index n is about 3 and the refractive index change is accomplished using carrier injection. The refractive index change is given by:

$$dn = -5.77 \times 10^{-3} \times (j/L)^{1/2} \quad (13)$$

where j is the current density in $kA/cm^2$ and L is the thickness of the structure. The maximum beam steering angle is given by:

$$\frac{\theta_{max}}{\theta_d} < 5.77 \times 10^{-3} \times \frac{n^2 N^{3/2}}{2}\left(\frac{j}{\Lambda_0}\right)^{1/2} \quad (14)$$

The current density is limited by heat transfer and j=10 $kA/cm^2$ is considered to be the practical limit. For a distribute d Bragg reflector structure designed to operate at an optical bandwidth $\lambda=1.55$ $\mu$m, the maximum steering angle $\theta_{max}/\theta_d \sim 1$ and 30 for N~10 and 100, respectively. Since this embodiment of the present invention uses forward biasing to change the refractive index, the steering speed is limited by the carrier recombination lifetime of one nanosecond or greater.

When multiple electric field ramps are used within a steerer according to the present invention, each ramp can be considered as providing a separate aperture for the optical beam. Therefore, $$\frac{\theta_{max}}{\theta_{dr}} < 5.77 \times 10^{-3} \times \frac{n^2 N^{3/2}}{2}\left(\frac{j}{\Lambda_0}\right)^{1/2} \quad (15)$$

where $\theta_{dr}$ is the diffraction angle for a given ramp aperture. The figure of merit for the device is not $\theta_{max}/\theta_{dr}$, but rather $\theta_{max}/\theta_d$ where $\theta_d$ is the diffraction angle for the full device. Since $\theta_d/\theta_{dr}$ is equal to the inverse of the number of ramps, the figure of merit for a multiple ramp device is given by:

$$\frac{\theta_{max}}{\theta_d} < 5.77 \times 10^{-3} \times \frac{Kn^2 N^{1/2}}{2}\left(\frac{j}{\Lambda_0}\right)^{1/2}$$

where K is the number of ramps.

As indicated above, the creation of the staircase electric field does not require a minimum or maximum number of electrodes to operate. Nor is there a requirement for a specific spacing or density of electrodes. However, as more electrodes are used and they are more closely spaced, the fringing effects of the electric field generated from each electrode will serve to smooth the transitions between the steps of the electric field. This will cause the electric field to more closely approximate a uniformly ramped electric field, such as that provided by the resistive layers discussed above. In the present invention, a uniformly ramped electric field provides superior steering performance over a staircase electric field.

FIG. 4 illustrates how the present invention is used to steer an optical beam in a single plane or dimension, the plane parallel to the direction of the variation in the electric field with the use of a staircase electric field. However, a staircase electric field can also be used to enable two dimensional beam steering with a chirped distributed Bragg reflector. As in the case of uniform electric fields, two orthogonal staircase electric fields provide the capability for steering an optical beam in two dimensions.

Figure 5:
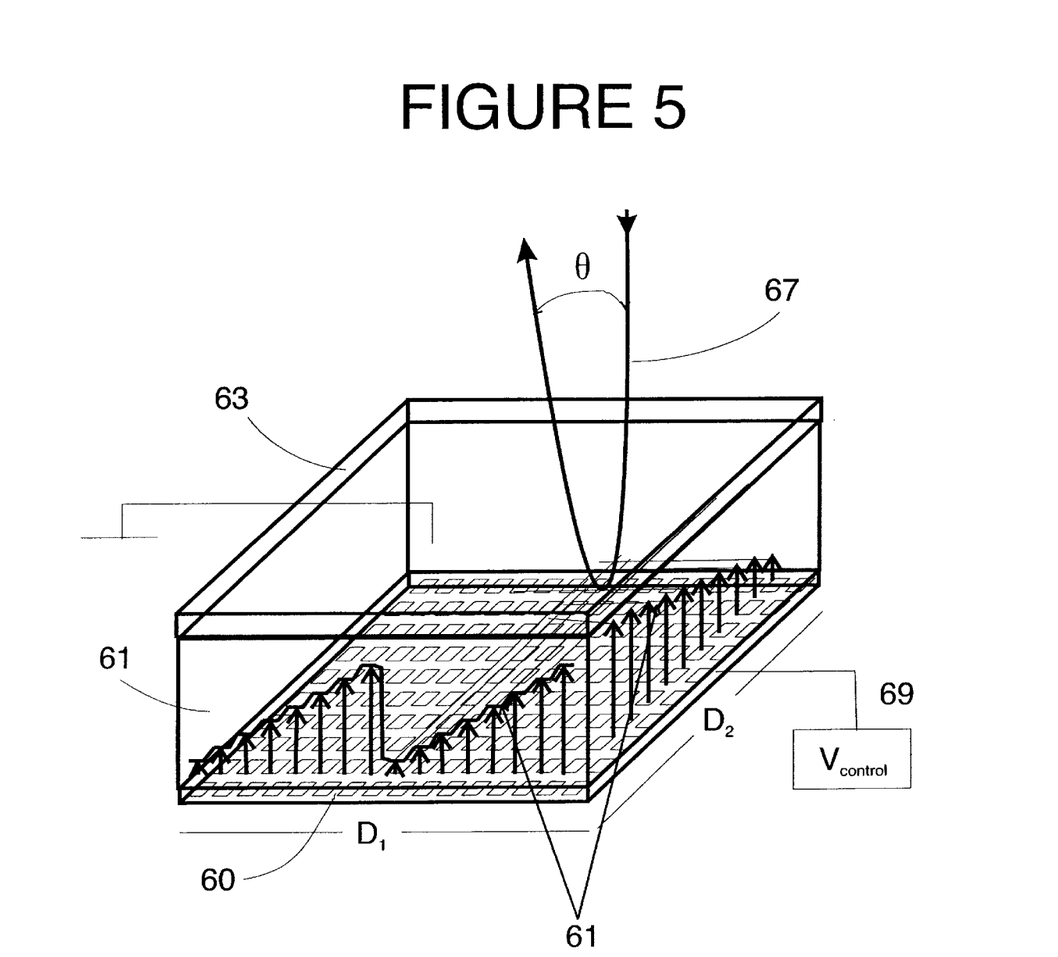
FIG. 5 shows a schematic representation of an embodiment of the present invention for two-dimensional beam steering using individually controllable pixels for controlling an electric field within electro-optically active material.

An embodiment of the present invention for two-dimensional beam steering using staircase electric fields is illustrated in FIG. 5. In this embodiment, a matrix of individually controllable conductors or pixels is used. FIG. 5 shows the matrix of pixels 60 located below the one or more layers of electro-optically active material 61 having a chirped distributed Bragg reflector formed within it. Each pixel is individually controlled by a control means 69 so that a staircase variation in electrical field 62 will be produced between the pixels 60 and the common conductor 63 in two directions within the electro-optically active material. Such an electrical field variation produces a staircase variation in the index of refraction that, when coupled with the chirped distributed Bragg reflector in the one or more layers of electro-optically active material 61, reflects the incident light beam 67 at an angle θ normal to the oblique plane defined by the variation in the electric field. The maximum steering angle in the two tangential directions is dependent upon the number of electrodes present in those directions.

The individually controlled pixels used in embodiments of the present invention also provide the capability for implementing adaptive optics. The electric field generated by each pixel is controlled to provide individually controllable variations in the index of refraction within the electro-optically active material. These individual variations provide variations in the delays applied to the wavefront of the incident optical beam, thus resulting in different phase shifts to the wavefront of the reflected optical beam. These phase shifts are used to distorting the optical beam in a controllable fashion. This distortion can be used to compensate for atmospheric effects or other distortion that has occurred in the incident light beam as is well known in the field of adaptive optics. Thus, alternative embodiments of the beam steerer according to the present invention provide both beam steering capability and optical beam correction.

From the foregoing description, it will be apparent that the present invention has a number of advantages, some of which have been described above, and others of which are inherent in the embodiments of the invention described above. Also, it will be understood that modifications can be made to the optical beam steerer and the method for optical beam steering described above without departing from the teachings of subject matter described herein. As such, the invention is not to be limited to the described embodiments except as required by the appended claims.

What is claimed is:

1. An optical beam steering device comprising:
   at least one layer of electro-optically active material;
   a chirped distributed Bragg reflector formed within said at least one layer of electro-optically active material and said chirped distributed Bragg reflector having a direction of propagation parallel to light incident on said at least one layer of electro-optically active material; and
   means for applying an electric field across said at least one-layer of electro-optically active material in a direction parallel to the direction of propagation of said chirped distributed Bragg reflector,
   wherein said means for applying an electric field varies the electric field across said at least one layer of electro-optically active material in a direction normal to said direction of propagation.

2. The optical beam steerer according to claim 1 wherein said means for applying an electric field varies said electric field in a uniform fashion.

3. The optical beam steerer according to claim 2 wherein said means for applying an electric field comprises:
   a common conductor layer located on one side of said at least one layer of electro-optically active material;
   a resistive layer located on the side of said at least one layer of electro-optically active material opposite the location of said common conductor; and,
   a voltage source connected to said resistive layer and to said common conductor layer;
   whereby an electric field is created with an intensity that varies linearly between said common conductor layer and said resistive layer in a direction normal to light incident on said electro-optically active material.

4. The optical beam steerer according to claim 3 wherein said common conductor layer is substantially transparent to light incident on said at least one layer of electro-optically active material.

5. The optical beam steerer according to claim 3 wherein said resistive layer is substantially transparent to light incident on said at least one layer of electro-optically active material.

6. The optical beam steerer according to claim 2 wherein said means for applying an electric field comprises:
   a first resistive layer located on a side of said at least one layer of electro-optically active material;
   a second resistive layer located on the side of said at least one layer of electro-optically active material opposite said first resistive layer;
   a first voltage source connected to said first resistive layer, said first voltage source creating a first electric field with an intensity that varies linearly across said at least one layer of electro-optically active material; and
   a second voltage source connected to said second resistive layer, said second voltage source creating a second electric field with an intensity that varies linearly across said at least one layer of electro-optically active material in a direction perpendicular to the variation of the intensity of said first electric field;
   whereby said first electric field and said second electric field combine to create a single electric field with an intensity that varies in a plane normal to light incident on said at least one layer of electro-optically active material.

7. The optical beam steerer according to claim 6 wherein said first resistive layer is substantially transparent to light incident on said at least one layer of electro-optically active material.

8. The optical beam steerer according to claim 6 wherein said second resistive layer is substantially transparent to light incident on said at least one layer of electro-optically active material.

9. The optical beam steerer according to claim 1 wherein said means for applying an electric field varies said electric field in a step-wise fashion.

10. The optical beam steerer according to claim 9 wherein said means for applying an electric field comprises:
    a common conductor layer located on a side of said at least one layer of electro-optically active material; and
    a plurality of electrodes located on the side of said at least one layer of electro-optically active material opposite said common conductor;
    an electric field generator connected to said plurality of electrodes, said electric field generator controlling said plurality of electrodes to generate an electric field across said at least one layer of electro-optically active material that varies in intensity periodically from a minimum value to a maximum value in a continuous progression of a fixed number of steps per period.

11. The optical beam steerer according to claim 10 wherein said common conductor layer is substantially transparent to light incident on said at least one layer of electro-optically active material.

12. The optical beam steerer according to claim 10 wherein said plurality of electrodes is substantially transparent to light incident on said at least one layer of electro-optically active material.

13. The optical beam steerer according to claim 10 wherein a variation in the intensity of said electric field from said minimum value to said maximum value causes light incident on said at least one layer of electro-optically active material to be phase-shifted by $2\pi$.

14. The optical beam steerer according to claim 9 wherein said means for applying an electric field comprises:

a common conductor layer located on a side of said at least one layer of electro-optically active material;

a matrix of individually addressable pixels located on a side of said at least one layer of electro-optically active material opposite said common conductor, said pixels separated from one another in two perpendicular directions; and, an electric field generator connected to said matrix of pixels, said electric field generator controls said matrix of pixels to generate an electric field across said at least one layer of electro-optically active material that varies periodically from a minimum value to a maximum value in a continuous progression of a fixed number of steps per period.

15. The optical beam steerer according to claim 14 wherein said common conductor layer is substantially transparent to light incident on said at least one layer of electro-optically active material.

16. The optical beam steerer according to claim 14 wherein said matrix of individually addressable pixels is substantially transparent to light incident on said at least one layer of electro-optically active material.

17. The optical beam steerer according to claim 14 wherein a variation in the intensity of said electric field from said minimum value to said maximum value causes light incident on said at least one layer of electro-optically active material to be phase-shifted by $2\pi$.

18. The optical beam steerer according to claim 14 wherein said electric field generator individually controls each pixel in said matrix of pixels to apply a different phase shift to a wavefront of light incident on said at least one layer of electro-optically active material.

19. The optical beam steerer according to claim 1 wherein said at least one layer of electro-optically active material comprises an electro-refractive semiconductor chirped distributed Bragg reflector structure and said electric field is applied in direct direction of a semiconductor junction in said electro-refractive semiconductor chirped distributed Bragg reflector structure.

20. The optical beam steerer according to claim 1 wherein said at least one layer of electro-optically active material comprises an electro-refractive semiconductor chirped distributed Bragg reflector structure and said electric field is applied in inverse direction of semiconductor junction in said electro-refractive semiconductor chirped distributed Bragg reflector structure.

21. The optical beam steerer according to claim 1 wherein said electro-optically active material is lithium niobate, lithium tantalate, lithium niobate doped with titanium, aluminum arsenide, or aluminum gallium arsenide.

22. A method for steering an optical beam comprising the steps of transmitting the optical beam into electro-optically active material, said electro-optically active material having a chirped distributed Bragg reflector formed within that reflects said optical beam at a turning point within said electro-optically active material, said chirped distributed Bragg reflector having a direction of propagation parallel to the optical beam;

applying a varying electric field to said electro-optically active material, said electric field being applied parallel to the propagation direction of the chirped distributed Bragg reflector and the direction of variation of said electric field being normal to the angle at which said optical beam is to be steered:

transmitting the reflected optical beam out of said electro-optically active material.

23. The method of claim 22 wherein said electric field varies linearly.

24. The method of claim 22 wherein said electric field varies periodically from a minimum value to a maximum value in a continuous progression of a fixed number of steps per period.

25. The method of claim 22 wherein said electro-optically active material comprises an electro-refractive semiconductor chirped distributed Bragg reflector structure and said electric field is applied in direct direction of a semiconductor junction in said electro-refractive semiconductor chirped distributed Bragg reflector structure.

26. The method of claim 22 wherein said electro-optically active material comprises an electro-refractive semiconductor chirped distributed Bragg reflector structure and said electric field is applied in inverse direction of a semiconductor junction in said electro-refractive semiconductor chirped distributed Bragg reflector structure.

27. The method of claim 22 wherein said electro-optically active material is lithium niobate, lithium tantalate, lithium niobate doped with titanium, aluminum arsenide, or aluminum gallium arsenide.

28. A method of optical beam correction comprising the steps of transmitting a distorted optical beam into electro-optically active material, said electro-optically active material having a chirped distributed Bragg reflector formed within that reflects said optical beam at a turning point within said electro-optically active material, said chirped distributed Bragg reflector having a direction of propagation parallel to the optical beam;

applying a varying electric field to said electro-optically active material, said electric field being applied parallel to the propagation direction of the chirped distributed Bragg reflector;

controlling said electric field to apply varying phase shifts to a wavefront of said distorted optical beam, said phase shifts correcting distortions in said distorted optical beam;

transmitting a corrected optical beam out of said electro-optically active material.

29. The method of claim 28 wherein said electro-optically active material comprises an electro-refractive semiconductor chirped distributed Bragg reflector structure and said electric field is applied in direct direction of a semiconductor junction in said electro-refractive semiconductor chirped distributed Bragg reflector structure.

30. The method of claim 28 wherein said electro-optically active material comprises an electro-refractive semiconductor chirped distributed Bragg reflector structure and said electric field is applied in inverse direction of a semiconductor junction in said electro-refractive semiconductor chirped distributed Bragg reflector structure.

31. The method of claim 28 wherein said electro-optically active material is lithium niobate, lithium tantalate, lithium niobate doped with titanium, aluminum arsenide, or aluminum gallium arsenide.

* * * * *